Feb. 20, 1940.  J. G. CAPSTAFF  2,191,038
PHOTOGRAPHIC COLOR FILM AND PROCESS
Filed Nov. 19, 1938

Inventor
John G. Capstaff

Attorneys

Patented Feb. 20, 1940

2,191,038

UNITED STATES PATENT OFFICE 2,191,038

PHOTOGRAPHIC COLOR FILM AND PROCESS

John G. Capstaff, Rochester, N. Y., assignor to Eastman Kodak Company, Rochester, N. Y., a corporation of New Jersey Application November 19, 1938, Serial No. 241,424

5 Claims. (Cl. 95—2)

This invention relates to color photography and more particularly to lenticular film color records and a method for making the same.

In my copending application Serial No. 108,036, filed October 28, 1936, now U. S. Patent No. 2,143,762 of Jan. 10, 1939, I describe and claim a lenticular film which is reproducible to give additive colors and a process for making the film by which the desired color separation in the film is accomplished subtractively. When such original color separation is obtained by using three superimposed emulsion layers, the diffusion of light by the emulsions may lower the resolving power in the bottom layer and as a result the color saturation will suffer.

In accordance with the present invention, one of the layers is developed as a dye image which will not be printed through the lenticulations carried by the film. Any one of the three layers may be selected to become the dye image, but if, as I prefer, the blue sensitive layer is chosen, the order of the layers on the support may be rearranged with the blue sensitive layer outermost. In this case the film is exposed in the camera with its emulsion layers facing the incident light and the lenticulations need not be covered temporarily with a transparent varnish as was the case in the preferred form disclosed in my above-identified application.

In accordance with the preferred aspect of my invention, a lenticular support is provided on its plane surface with a plurality of differentially color sensitized emulsion layers, the primary sensitivity of each being for a different one of the component colors desired to be employed. In this film the outermost layer is sensitive only to the blue and the two underneath layers are sensitive to the red and the green, respectively, and in any order desired. As is well-known, the blue layer may contain a yellow dye or be separated from the underneath layers by a yellow filter layer so as to screen the red and green sensitive layers from blue light. This film is then exposed to a multi-color image to provide latent images in the three emulsion layers which correspond to the blues, the greens and the reds, respectively, appearing in the original. After the camera exposure, the film is printed through the lenticulations to expose uniformly separate areas behind each lenticulation so that one layer receives no exposure, in another layer one area is not exposed and in the third layer a different area is not exposed. These layers are then developed and the layer which was not exposed is converted to a dye image to provide a film having three color separation images distributed through the three layers and which in combination with a banded color filter will reproduce the colors of the original.

The novel features which I believe to be characteristic of my invention are set forth in the appended claims. The invention itself, however, will best be understood by reference to the following description when read in connection with the accompanying drawing, in which:

Figure 1:
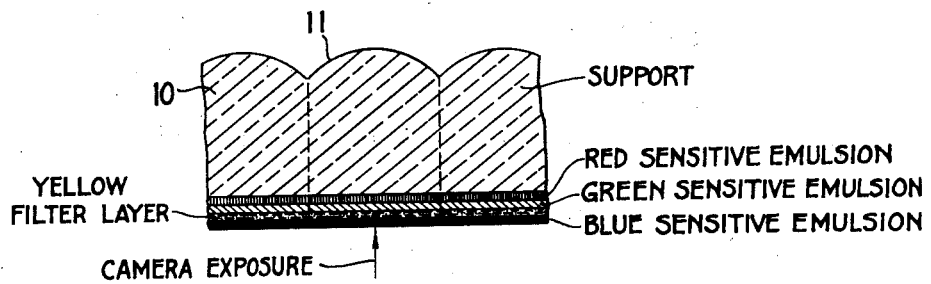
Fig. 1 shows on an enlarged scale, a lenticular film provided with a monopack of differently sensitized layers.

In practicing the preferred form of the invention, a support 10, provided with lenticulations 11 and having on its smooth face three emulsion layers which, as indicated in the drawing are individually sensitive to the red, green and blue, respectively, is exposed in the camera with these emulsions facing the incident light.

Although the blue layer preferably contains a yellow screening dye, in the interests of clarity I have indicated in Fig. 1 a separate yellow filter layer lying between the blue and green sensitive layers. The number of emulsion layers provided on the support 10 will depend upon the number of component colors it is desired to record or employ in the process, but inasmuch as it is common practice to employ three colors, the invention will be described in detail as a three-color process. The actual colors chosen may, of course, show wide variation, but usually will be approximately the blue, green and red, as indicated on the drawing.

With the film as shown in Fig. 1 exposed in a camera, the outermost layer will record the blue and the underlying yellow filter layer will prevent any blue from reaching the green and red sensitive layers. This filter layer will, of course, transmit the green and red, which will be recorded respectively in the green and red sensitive layers.

Figure 2:
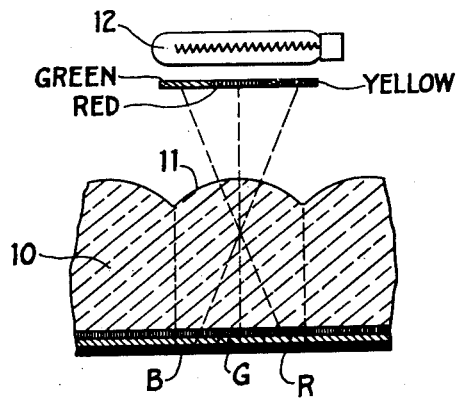
Fig. 2 illustrates diagrammatically an arrangement for selectively exposing certain areas of the monopack layers.
Figure 3:
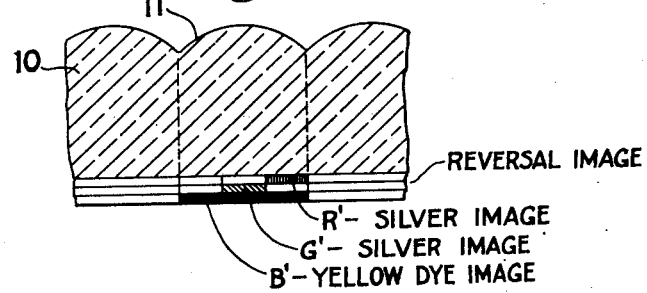
Fig. 3 illustrates one type of developed picture film resulting from the methods of the invention.

This film after exposure will have latent images corresponding to the three color separation components of the original and this film is then re-exposed through its lenticulations 11 to light which does not affect the blue sensitive layer B, but which does selectively affect the green and red layers. This is most readily done by exposing through a banded filter and one suitable conventional arrangement is shown in Fig. 2 as comprising a light source 12 which illuminates the film 10 through a banded filter having three zones, one of which transmits green light, another transmits red, and the third transmits both green and red so that in one area behind each lenticulation 11 the green layer is exposed, in another area the red layer is exposed and in the third area both the green and red layers will be exposed. This supplemental or printing exposure thus leaves the red layer unexposed in one area, the green layer unexposed in another area, and, of course, the blue sensitive layer is not exposed in any area, and upon development by a reversal process, these exposed areas are completely bleached and become transparent and there remains only a positive silver image in two layers in two different areas and a continuous image, the blue, throughout all three areas. The blue layer is then converted in any well-known manner to a yellow dye image so that where it overlaps the green and red records which are to control the transmission of light through the green and red filter areas, it will not interfere since it readily transmits all green and red light, whereas in the area of the film behind the lenticulation which controls the transmission of light through the blue filter, it will do so in the same way as would a silver image.

If the color sensitivity of the individual emulsion layers is preserved after the first development and bleaching an alternative procedure may be followed. In this case, the red and green sensitive layers would be re-exposed to yellow light and developed to a positive image after which the blue sensitive layer would be re-exposed to blue light and developed to a positive image in a yellow dye.

Each of the above procedures results in a finished film which may be printed or reproduced by projection in the same way as can an ordinary lenticular film.

Although the processes have been described above as applied to the preferred form of the invention, wherein the blue sensitive layer is made into a continuous yellow dye image, it will be obvious that the invention is not restricted to this specific form, since any one layer may be made into a continuous dye image so long as it is dyed to a color which is minus the color component which it represents. Thus, if the green sensitive layer is selected to be the continuous dye image, it will be processed to a continuous magenta image and with the blue and red images discontinuous and in silver. In case the red image is made the continuous one, it will, of course, be dyed blue-green.

Although I have described in detail specific steps for practicing the method of my invention and a preferred form of the original photographic record contained thereby it will be obvious to those skilled in the art that the individual steps of the method may be performed in other and sundry ways and that the arrangement of the images in the original record may be varied without departing from the spirit of my invention, the scope of which is pointed out in the appended claims.

What I claim as new and desire to be secured by Letters Patent of the United States is:

1. A photographic record comprising a support provided with lenticulations on one of its faces, three developed emulsion layers carried by the other face of the support, a silver image in each of two of said layers and corresponding respectively to two of three component spectral colors, each silver image being composed of a large number of separate elements, one under each lenticulation and the image elements under each lenticulation occupying separate areas thereunder, and a dye image in the other of said layers corresponding to the other of said spectral colors, said dye image being continuous and of a color transparent to light of the colors represented by said first two layers.

2. A photographic record as claimed in claim 1, wherein the two silver images represent the red and green records, respectively, and the dye image is yellow and represents the blue record.

3. In a lenticular film three-color process, the method of producing the photographic original which comprises exposing to a color image formed with light incident on the smooth face of a lenticular film having on its smooth face three emulsion layers, each of which is sensitized for a different one of the three component spectral colors, exposing through the lenticulations three separate and substantially equal areas behind each lenticulation to light of such character, respectively, that in one area only two of said emulsion layers are exposed, in another area only one of said two layers is exposed, and in the third area only the other one of said two layers is exposed, developing all three emulsion layers by a reversal process, and converting the image in the third emulsion layer to a colored image which transmits the two spectral colors presented by said two layers.

4. In a lenticular film three-color process in which three emulsion layers carried by and exposed on the smooth face of the film individually record as latent images a separate one of three component colors, the method of processing the latent image-containing layers which comprises selectively and uniformly exposing through the lenticulations three separate areas of substantially equal size behind each lenticulation to differently colored light so that in one area two layers are exposed, in another area one of said two layers is exposed, in the third area the other one of said two layers is exposed and the third layer receives no exposure, developing the latent images to positive images, whereby said two layers contain discontinuous images representing two of the component colors and the third layer contains a continuous image representing the third of the component colors, and rendering the continuous image transparent to light of the colors represented by the two discontinuous images and opaque to light of the color it represents.

5. In a three-color photographic process employing lenticular film in which the three-color component images occupy three separate areas behind each lenticulation, the method of obtaining the original which comprises exposing to a multi-color image the smooth side of a lenticular film carrying an emulsion having three layers so arranged and sensitized that each layer is exposed by a single and different one of the three component colors, blue, green and red, uniformly exposing through the lenticulations each of the three separate areas behind each lenticulation to yellow, green and red light, respectively, removing the exposed silver from all of the emulsion layers, uniformly exposing to yellow light to render developable the red and green sensitive layers, developing to positive images said red and green layers, uniformly exposing to blue light the blue sensitive layer, and developing said blue layer to a positive image in a yellow dye.

JOHN G. CAPSTAFF.